(12) United States Patent
Lee et al.

(10) Patent No.: US 10,939,336 B2
(45) Date of Patent: Mar. 2, 2021

(54) METHOD FOR ESTIMATING MOBILITY STATE OF UE AND DEVICE SUPPORTING THE SAME

(71) Applicant: LG ELECTRONICS INC., Seoul (KR)

(72) Inventors: Yejee Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 16/376,919

(22) Filed: Apr. 5, 2019

(65) Prior Publication Data
US 2019/0313297 A1    Oct. 10, 2019

(30) Foreign Application Priority Data
Apr. 5, 2018  (KR) ........................ 10-2018-0039993

(51) Int. Cl.
*H04W 36/00* (2009.01)
*H04W 8/08* (2009.01)
*H04W 36/08* (2009.01)

(52) U.S. Cl.
CPC ......... *H04W 36/0061* (2013.01); *H04W 8/08* (2013.01); *H04W 36/0083* (2013.01); *H04W 36/08* (2013.01)

(58) Field of Classification Search
CPC ......... H04W 36/0061; H04W 36/0083; H04W 36/08; H04W 8/08; H04W 8/02
USPC ........................................................ 370/331
See application file for complete search history.

(56) References Cited

U.S. PATENT DOCUMENTS

| | | | |
|---|---|---|---|
| 2009/0170510 A1* | 7/2009 | Kim ..................... | H04W 36/30 455/434 |
| 2015/0050934 A1* | 2/2015 | Jung ................. | H04W 36/0083 455/437 |
| 2015/0201395 A1* | 7/2015 | Jeong .................... | H04W 64/00 455/456.1 |
| 2018/0020330 A1* | 1/2018 | Li ......................... | H04W 88/02 |

* cited by examiner

*Primary Examiner* — Rownak Islam
(74) *Attorney, Agent, or Firm* — Lee Hong Degerman Kang Waimey

(57) ABSTRACT

Provided are a method of estimating mobility state of an UE and a device supporting the method. According to one embodiment of the present invention, the method includes: entering a second cell from a first cell, wherein the first cell provides specific information; receiving neighbor cell list from the second cell; and counting a number of cell changes for mobility state, based on whether the neighbor cell list from the second cell includes at least one of neighbor cells providing the specific information.

12 Claims, 10 Drawing Sheets

METHOD FOR ESTIMATING MOBILITY STATE OF UE AND DEVICE SUPPORTING THE SAME

CROSS-REFERENCE TO RELATED APPLICATIONS

Pursuant to 35 U.S.C. § 119 (e), this application claims the benefit of earlier filing date and right of priority to Korean Patent Application No. 10-2018-0039993, filed on Apr. 5, 2018, the contents of which are hereby incorporated by reference herein in its entirety.

BACKGROUND OF THE INVENTION

Field of the Invention

The present invention relates to a wireless communication system, and more particularly, to a method for estimating mobility state of UE and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, In the LTE network, mobility state of a UE is determined by number of cell reselections during recent time period. That is, the UE may determine its mobility state only based on the number of cell reselection. As the UE performs mobility state estimation frequently in a certain time period, the UE determines itself as being in higher mobility state. So the UE cannot realize its own mobility as far as cell reselection is not occurred even though it is moving fast.

In order to ensure high quality of user experience in high speed train, we have already exploited dedicated resource or specific design for the coverage of high speed railway, which is normally called "High-speed-railway dedicated LTE network". The so-called "High-speed-railway dedicated network (HSDN)" is different from the network deployed for normal ground users or low-medium mobility users that is normally called "public LTE network".

SUMMARY OF THE INVENTION

According to a prior art, during the UE on the train stays at the train station, the UE would not frequently reselect to other cells, so the mobility state of the UE may be considered as medium or normal speed.

According to an embodiment of the present invention, a method for a user equipment (UE) in wireless communication system is provided. The method may comprise: entering a second cell from a first cell, wherein the first cell provides specific information; receiving neighbor cell list from the second cell; and counting a number of cell changes for mobility state, based on whether the neighbor cell list from the second cell includes at least one of neighbor cells which provides the specific information.

The specific information may inform that a cell providing the specific information is high-speed-railway dedicated network (HSDN) cell.

The HSDN cell may include plurality of public cells.

The second cell may be a public cell.

The counting the number of cell changes for mobility state may include: increasing the counting until that the mobility state of the UE is considered as high mobility state when the neighbor cell list from the second cell includes the at least one of neighbor cells providing the specific information.

The method may further comprise: entering a third cell from the second cell; receiving neighbor cell list from the third cell; decreasing the counting until that the mobility state of the UE is considered as normal mobility state when the neighbor cell list from the third cell does not include the at least one of neighbor cells providing the specific information.

The counting the number of cell changes for mobility state may include: counting cell change from the first cell to the second cell when the neighbor cell list from the second cell does not include the at least one of neighbor cells providing the specific information.

The method may further comprise: adjusting priority on the first cell as a highest priority when the neighbor cell list includes the at least one of neighbor cells providing the specific information.

The method may further comprise: adjusting priority on the first cell as a lowest priority when the neighbor cell list does not include the at least one of neighbor cells providing the specific information.

According to another embodiment of the present invention, a user equipment (UE) in a wireless communication system is provided. The UE may comprise: a transceiver for transmitting or receiving a radio signal; and a processor coupled to the transceiver, the processor configured to: enter a second cell from a first cell, wherein the first cell provides specific information; receive neighbor cell list from the second cell; and count a number of cell changes for mobility state, based on whether the neighbor cell list from the second cell includes at least one of neighbor cells which provides the specific information.

The specific information may inform that a cell providing the specific information is high-speed-railway dedicated network (HSDN) cell.

The HSDN cell may include plurality of public cells.

The second cell may be a public cell.

The counting the number of cell changes for mobility state may include: increasing the counting until that the mobility state of the UE is considered as high mobility state when the neighbor cell list includes the at least one of neighbor cells providing the specific information.

According to another embodiment of the present invention, a processor for a wireless communication device in a wireless communication system is provided. The processor may be configured to control the wireless communication device to: enter a second cell from a first cell, wherein the first cell provides specific information; receive neighbor cell list from the second cell; and count a number of cell changes for mobility state, based on whether the neighbor cell list from the second cell includes at least one of neighbor cells which provides the specific information.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
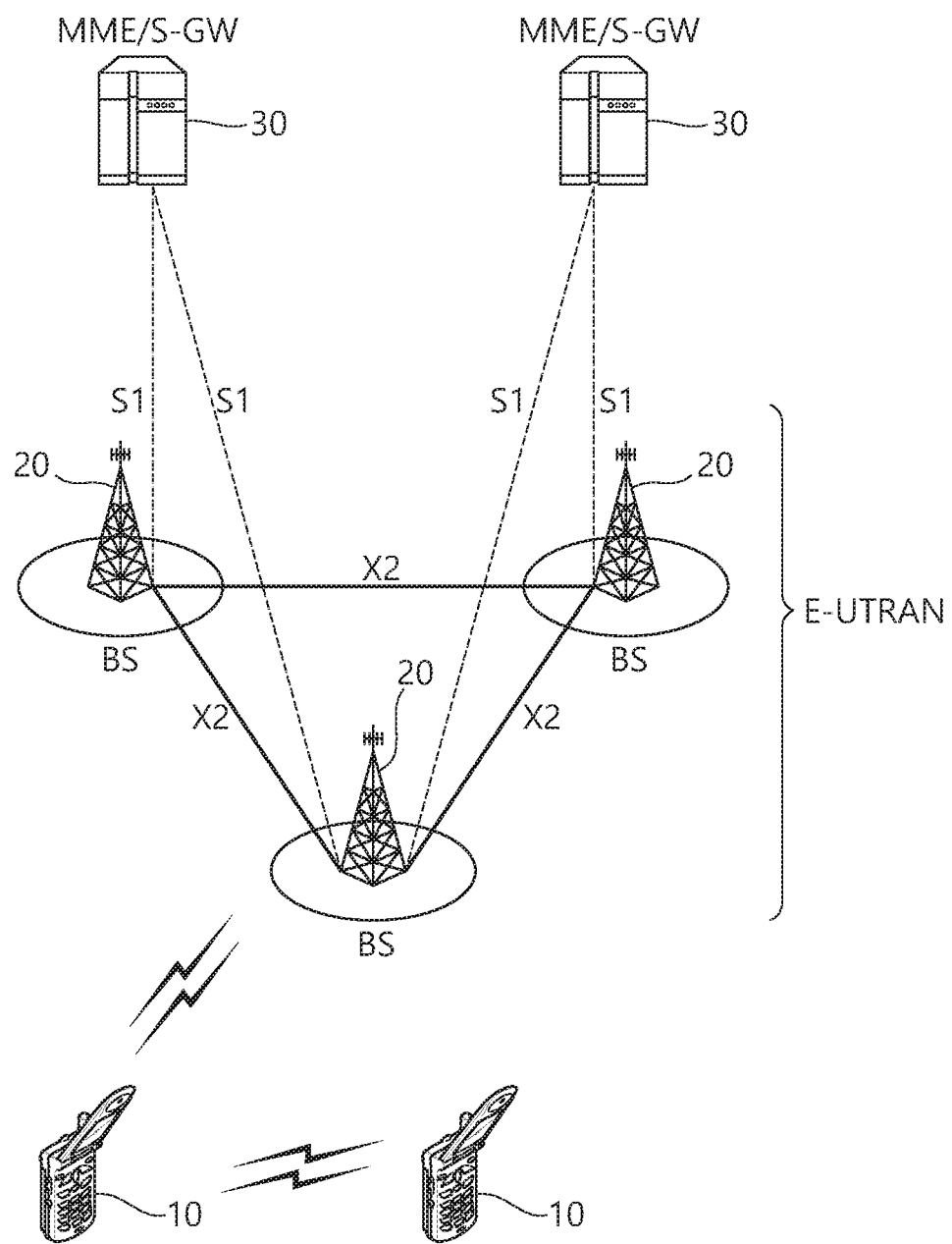
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
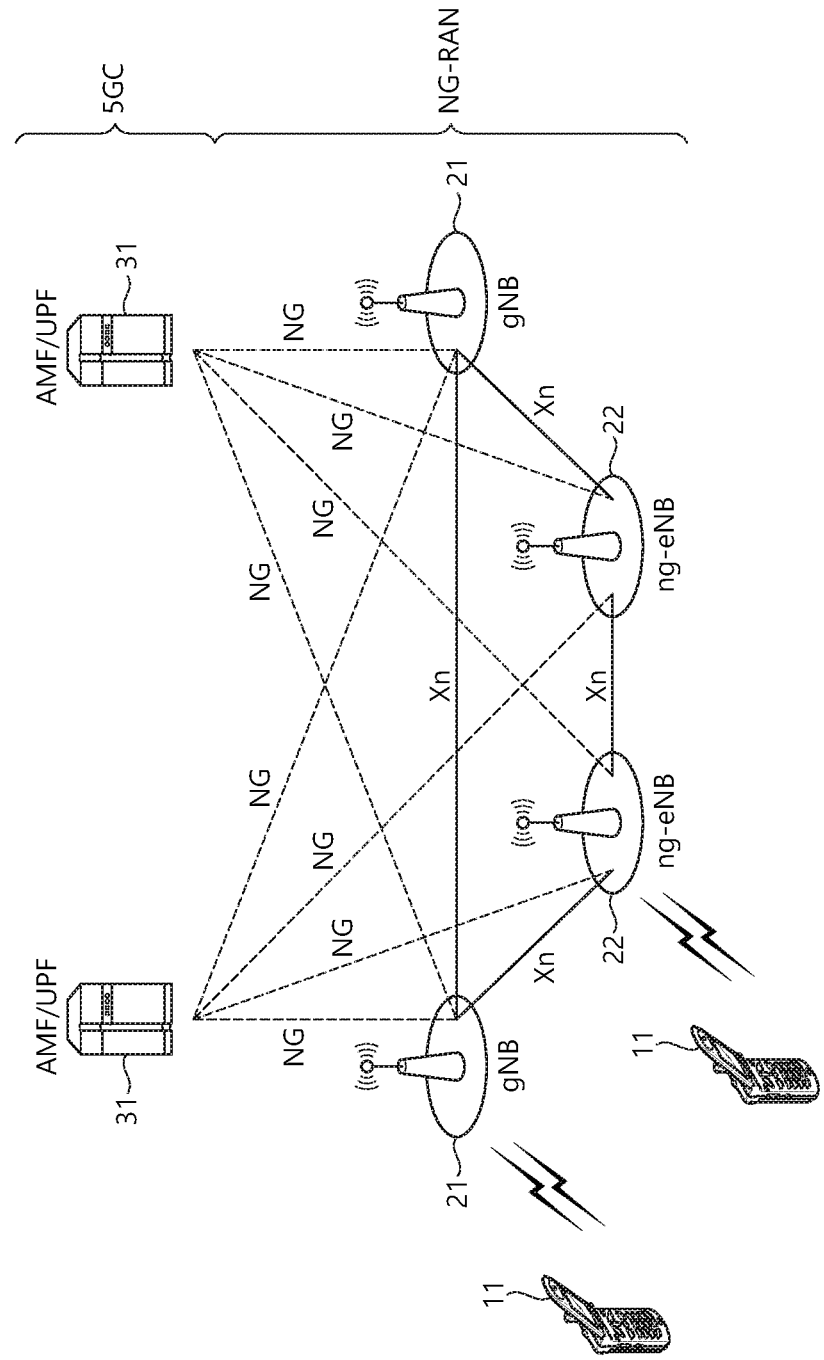
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
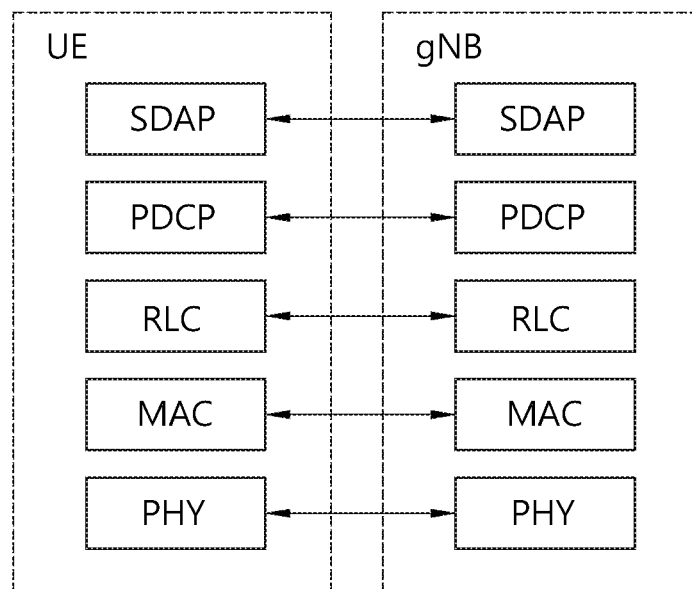
FIG. 3 shows a block diagram of a user plane protocol stack to which technical features of the present invention can be applied.
Figure 4:
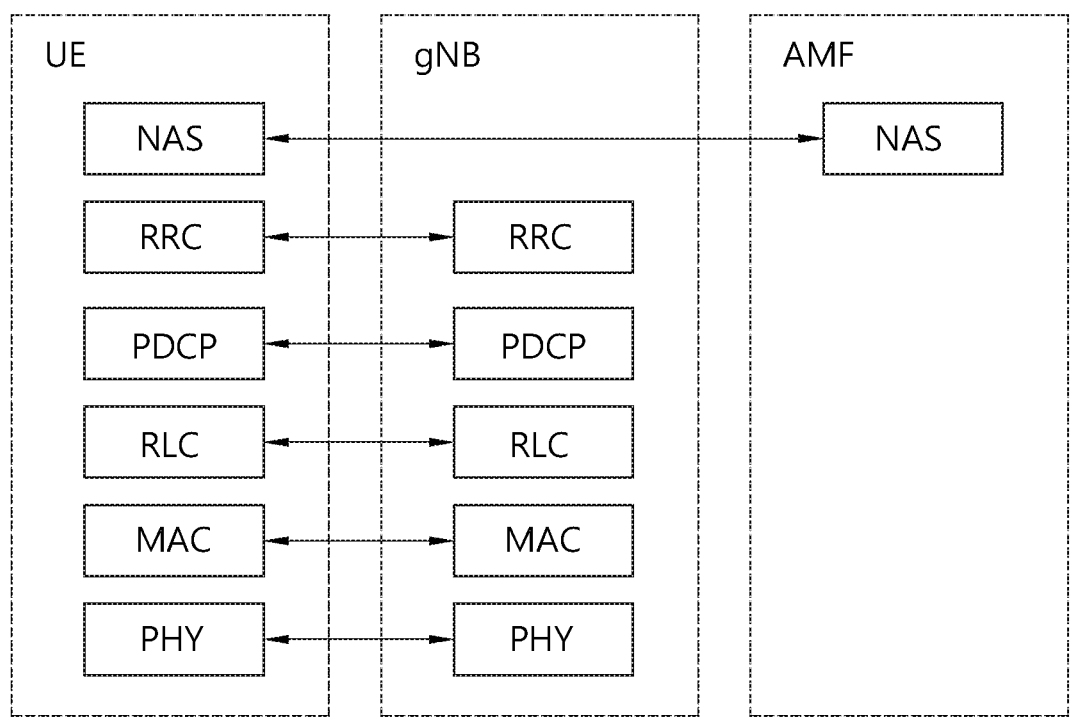
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, estimating mobility states of a UE is described.

Besides Normal-mobility state a High-mobility and a Medium-mobility state are applicable if the parameters ($T_{CRmax}$, $N_{CR\_H}$, $N_{CR\_M}$ and $T_{CRmaxHyst}$) are sent in the system information broadcast of the serving cell.

State detection criteria is classified into Medium-mobility state criteria and High-mobility state criteria.

Medium-Mobility State Criteria:
If number of cell reselections during time period $T_{CRmax}$ exceeds $N_{CR\_M}$ and not exceeds $N_{CR\_H}$ High-Mobility State Criteria:
If number of cell reselections during time period TCRmax exceeds NCR_H The UE shall not count consecutive reselections between same two cells into mobility state detection criteria if same cell is reselected just after one other reselection.

State transitions are described as follow.
The UE shall:
if the criteria for High-mobility state is detected, enter High-mobility state.
else if the criteria for Medium-mobility state is detected, enter Medium-mobility state.
else if criteria for either Medium- or High-mobility state is not detected during time period $T_{CRmaxHyst}$, enter Normal-mobility state.

If the UE is in High- or Medium-mobility state, the UE shall apply the speed dependent scaling rules.

In order to ensure high quality of user experience in high speed train, we have already exploited dedicated resource or specific design for the coverage of high speed railway, which is normally called "High-speed-railway dedicated LTE network". The so-called "High-speed-railway dedicated network (HSDN)" is different from the network deployed for normal ground users or low-medium mobility users that is normally called "public LTE network".

Figure 5:
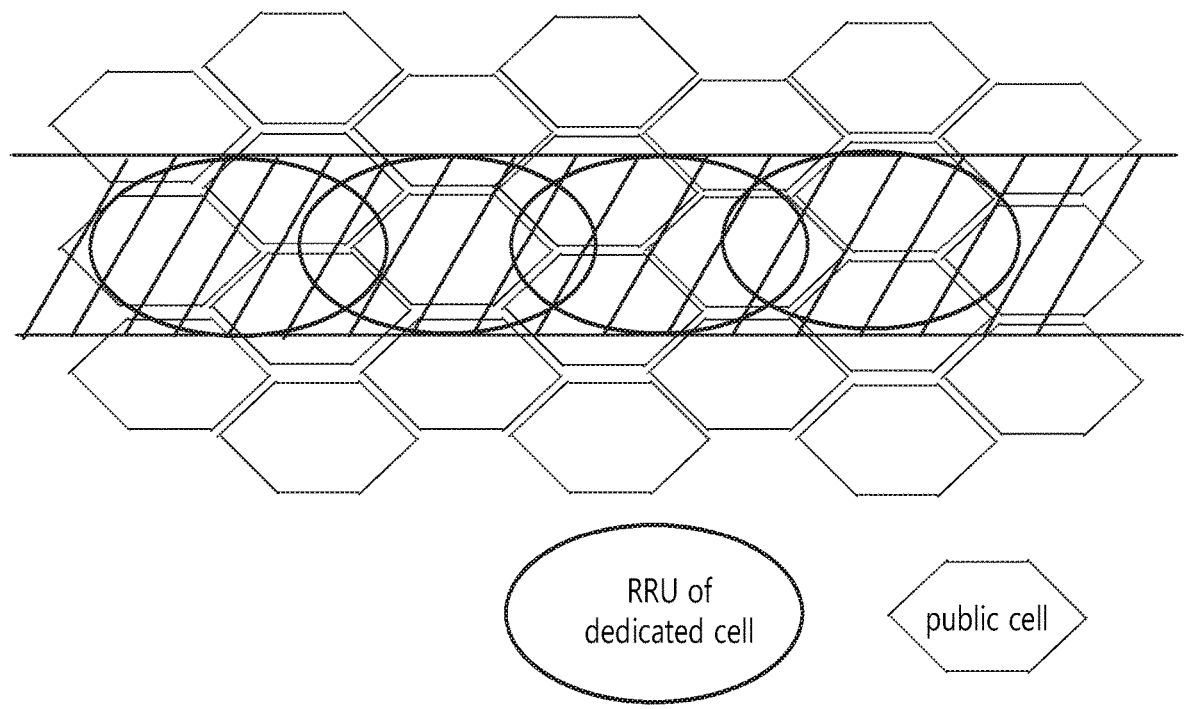
FIG. 5 shows an example of overlapped coverage between dedicated network and public network.

FIG. 5 shows an example of overlapped coverage between dedicated network and public network. As shown in FIG. 5, multiple radio resource utilization (RRU) are concatenated as one single cell.

The main purpose of deploying a dedicated LTE network for high speed railway is to provide good service for UEs on the high speed train. The dedicated LTE network is deployed either in the same frequency or different frequency with the public LTE network according to the spectrum resource in that area. During the operation of dedicated network, we have observed that lots of UEs which are not on the train may camp on and initiate service from this network, mainly due to the dedicated network normally has better coverage to compensate the penetration loss of train carriage and hence higher RSRP than the nearby public network from ground UE perspective, especially in those large population area where there are large proportion overlapped coverage between dedicated network and public network, as shown in FIG. 5. So the UEs near the railway may more prefer camping on the dedicated network while it is not desired from the network operation point of view, which has frequently caused congestion of the dedicated network. In real deployment, we have tried several schemes to solve this problem. However, they didn't work well due to the limitation of current specification and implementation.

The first scheme is for inter-frequency scenario, i.e. the dedicated network is deployed in a different frequency from the public network. We set the frequency of dedicated network with higher priority to help the UE return in a short order after it dropped from the dedicated network to public network when dedicated network is not available temporarily. However, both the UEs on the train and the UEs outside the train will high proportionally camp on the dedicated network.

The second scheme is as follows. In the real network, in order to prevent the UEs which are outside the train from reselecting to dedicated network, the nearby public eNB does not broadcast cell reselection parameters relating to the dedicated network. Meanwhile in order to prevent the UEs on the train from reselecting to the public network, the dedicated eNB does not broadcast cell reselection parameters relating to the public network, however, it cannot prevent UEs from camping on any network in its cell selection process. Especially, in the real network, we find out sometimes the UE on the train may lose coverage of the dedicated network just due to temporary unavailability of the dedicated coverage. As the coverage of dedicated network drops, UE is out of service. In this case, UE may perform cell (re)selection and probably camps on the public network. Since the public network does not broadcast cell reselection information relating to neighbour dedicated cells, the UE cannot take the cells of dedicated network as candidate reselection cells. Therefore, the UE cannot quickly reselect to the dedicated network, even if the coverage of dedicated network gets better. This is contrary to our intention of deploying the dedicated network.

The third scheme is introduction of load balancing based on UE speed identification in each network respectively. Public network can handover the high mobility UE to dedicated network and dedicated network can handover the low mobility UE to public network, while it will inevitably trigger more handover procedures to load more burdens to the network and risks to the UE experience.

Besides the experienced mechanisms discussed above, there is still another fundamental issue to be raised, i.e., the estimation of mobility state of a UE. The current mechanism for assisting estimation the mobility state of a UE is simply based on serving cell change during a certain period. But in the high speed railway network, several RRUs are concatenated in line and work as only one single cell to reduce the handover frequency and signalling overhead, in our network, typically 8~12 RRUs are concatenated, as shown in FIG. 5. Although UE has travelled a quite long distance in a certain period (i.e. high mobility UEs), the UE may probably only change very few cells, which may lead the scaling factor less effective or even helpless in either cell reselection or handover process (i.e. TTT).

Based on these observations from the our real network, it is desired that relatively complete mechanism to be worked out to improve the LTE performance as early as possible and such issues are to be considered in the very initial stage of NR design.

To improve the performance, HSDN neighboring cell list may be provided in SIB.

The HSDN capable UE in high mobility state has highest priority for HSDN cell regardless of frequency priority. When UE moves to HSDN cell, the UE counts weighted value for MSE. When HSDN capable UE is not in high mobility state, the UE deprioritize the priority of HSDN to the lowest priority.

The HSDN is proposed for high speed UE on the train. Once the UE moves to the HSDN, the UE would count amount of cell equivalent size which is broadcasted parameter value from network and the UE would be in high mobility by MSE algorithm. So, the UE can reselect to the neighbor HSDN with highest priority.

However, during the UE on the train stays at the train station, the UE would not frequently reselect to other cells. So, the MSE would become medium or normal speed. Once UE is not in high speed, the HSDN cell is lowest priority. Then, the UE would reselect to the normal cell which is not a HSDN. It would take a time to back to HSDN because the UE speed should be high speed again. Until UE speed comes back to the high, UE should frequently reselect to normal cells which are not HSDN.

Moreover, if UE gets off the train and walks to out of train station, UE would be in high speed for quite a while because UE was in HSDN cell. So, UE has highest priority for HSDN cell regardless of frequency priority. Therefore, if UE find a HSDN cell, UE reselects to the HSDN cell until UE becomes medium or normal speed even if UE moves far from the HSDN cell and the signal quality of the HSDN cell is worse than normal cells.

In conclusion, MSE enhancement should be considered for UE staying train station and getting off the train.

Figure 6:
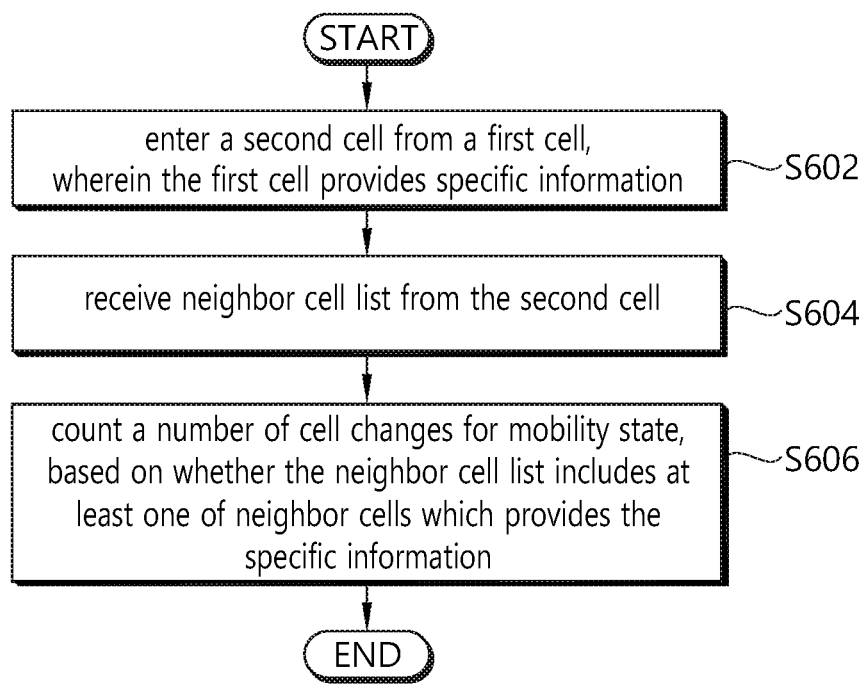
FIG. 6 shows a method for estimating mobility state of a UE according to an embodiment of the present invention.

FIG. 6 shows a method for estimating mobility state of a UE according to an embodiment of the present invention.

In step S602, the UE may enter a second cell from a first cell, wherein the first cell provides specific information. The specific information may inform that a cell providing the specific information is high-speed-railway dedicated network (HSDN) cell. The HSDN cell may include plurality of public cells. The second cell may be a public cell.

In step S604, the UE may receive neighbor cell list from the second cell.

In step S606, the UE may count a number of cell changes for mobility state, based on whether the neighbor cell list from the second cell includes at least one of neighbor cells providing the specific information. The counting the number of cell changes for mobility state may include: increasing the counting until that the mobility state of the UE is considered as high mobility state. The UE may be further configured to enter a third cell from the second cell; receive neighbor cell list from the third cell; decrease the counting until that the mobility state of the UE is considered as normal mobility state when the neighbor cell list from the third cell does not include the at least one of neighbor cells providing the specific information. The counting the number of cell changes for mobility state may include: counting cell change from the first cell to the second cell when the neighbor cell list from the second cell does not include the at least one of neighbor cells providing the specific information.

The UE may further configured to adjust priority on the first cell as a highest priority when the neighbor cell list includes the at least one of neighbor cells providing the specific information. The UE may further configured to adjust priority on the first cell as a lowest priority when the neighbor cell list does not include the at least one of neighbor cells providing the specific information.

According to embodiments of the present invention, the MSE may be improved by adjusting the number of cell reselections in consideration of various scenarios in which the UE is involved in the HDSN cell.

According to an embodiment of the present invention, cells are classified into HSDN cell, normal cell with HSDN neighbor cell and normal cell without HSDN neighbor cell. The HSDN cell may include plurality of normal cells. If the UE receives HSDN neighbor cell list from a normal cell, the UE may consider the normal cell as the normal cell with HSDN neighbor cell. When the mobility state of the UE is high speed, the HSDN cell may be set to highest priority for cell reselection. On the contrary, when the mobility state of the UE is medium or normal speed, the HSDN cell may be set to lowest priority for cell reselection. When a UE is located in the HSDN cell, it may be considered that the UE is in high speed. In specific, when the UE is located in the HSDN cell, the UE may increase MSE count as much as the number of normal cells included in the HSDN cell.

The normal cell with HSDN neighbor cell may be a neighbor cell of the HSDN cell. When the UE is located in the normal cell with HSDN neighbor cell, it may be considered that the UE may move in high speed soon.

The normal cell without HSDN neighbor cell may be cell located apart by a certain distance from the HSDN cell. When the UE is located in normal cell without HSDN neighbor cell, it may be considered that the UE is in normal speed.

Figure 7:
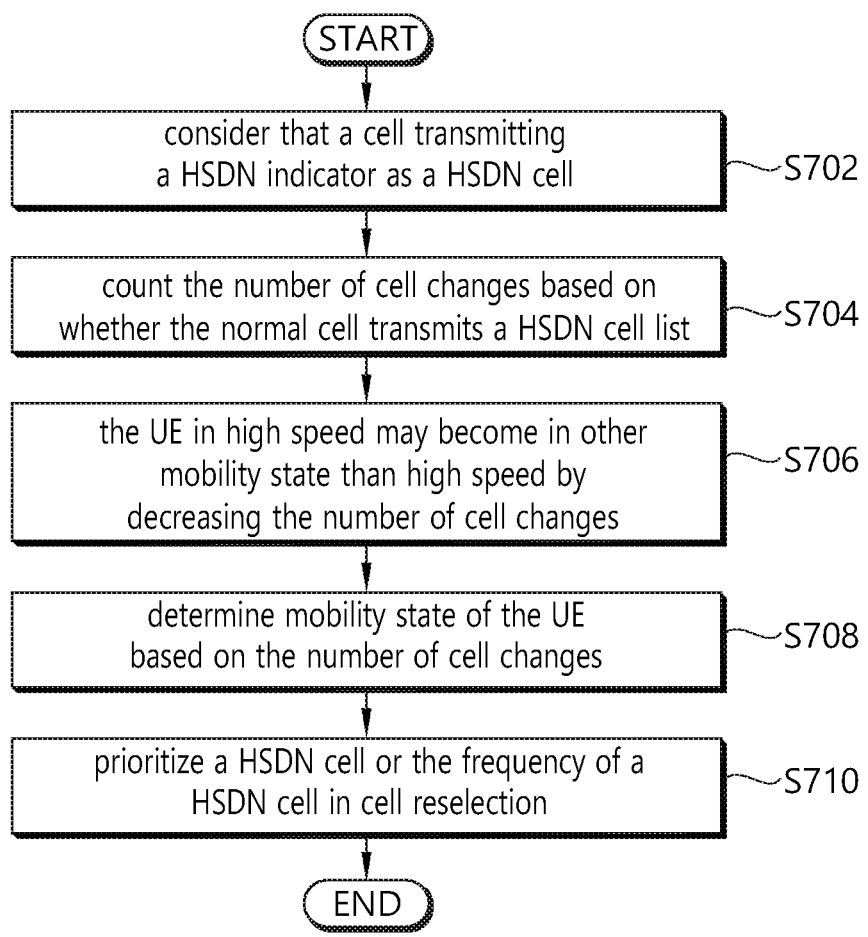
FIG. 7 shows a method for estimating mobility state of a UE according to an embodiment of the present invention.

FIG. 7 shows a method for estimating mobility state of a UE according to an embodiment of the present invention. According to an embodiment of the present invention, when UE performs cell change (e.g. cell reselection or handover), UE determines UE's mobility state. The UE which executes following steps may be capable of HSDN operation.

In step S702, the UE may be configured to consider that a cell transmitting a HSDN indicator as a HSDN cell. In this description, the HSDN cell may be referred as a dedicated cell. The UE may be configured to consider that a cell not transmitting a HSDN indicator as a normal cell. In this description, the normal cell may be referred as a public cell. The HSDN indicator may be broadcasted via system information. The UE may consider that a cell which transmits the indicator as a HSDN cell.

In step S704, when the UE performs cell change from a HSDN cell to a normal cell, UE may counts the number of cell changes based on whether the normal cell transmits a HSDN cell list. The HSDN cell list may be a neighbor cell list which includes a HSDN cell as a neighbor cell. The HSDN cell may not be restricted to cells that the UE was camping on. Therefore, a normal cell which is a neighbor cell of a HSDN cell may transmit a HSDN cell list. If the normal cell transmits HSDN cell list, the UE not in high speed may become in high speed by increasing the number of cell changes (e.g. by one or more counts). If the normal cell does not transmit HSDN cell list, the UE in high speed may become in other mobility state than high speed by decreasing the number of cell changes (e.g. by one or more counts).

In step S706, when UE performs cell change from a normal cell transmitting HSDN cell list to a normal cell not transmitting HSDN cell list, the UE in high speed may become in other mobility state than high speed by decreasing the number of cell changes (e.g. by one or more counts).

In step S708, the UE may determine mobility state of the UE based on the number of cell changes.

In step S710, if UE determines high speed as mobility state of the UE, UE may prioritize a HSDN cell or the frequency of a HSDN cell in cell reselection. The UE may consider the HSDN cell or the frequency of a HSDN cell as the highest priority in cell reselection.

In an embodiment of the present invention, the UE may adjust MSE count based on types of the previous serving cell and the current serving cell. The types of the previous serving cell or the current serving cell may be one of a HSDN cell, a neighbor cell with a HSDN neighbor cell, or a neighbor cell without a HSDN neighbor cell. The HSDN capable UE may take account of not only whether the current cell is a HSDN cell but also whether the previous cell was a HSDN cell in performing MSE. That is, the UE may increase or decrease MSE counting even when the current serving cell is not the HSDN cell. The UE may check whether the current serving cell or previous serving cell broadcasts HSDN neighbor cell list. Based on the conditions, the UE may increase or decrease the MSE count.

In first exemplary embodiment, the HSDN capable UE was camping on HSDN cell. When the UE moves to the normal cell which broadcasts HSDN neighbor cell list (e.g. UE in the train stops at train station), the UE may increase MSE count until UE becomes in high speed. When the UE moves to the normal cell which does not broadcast HSDN neighbor list (e.g. UE gets off train), the UE may decrease MSE count until UE would be in medium or normal speed. The UE may decrease the MSE count as much as the number of normal cells included in the HSDN cell.

In second exemplary embodiment, the HSDN capable UE was camping on normal cell which broadcasts HSDN neighbor list. When the UE moves to the normal cell which does not broadcast HSDN neighbor list (e.g. UE gets out of train station), the UE may decrease MSE count until UE would be in medium or normal speed.

Figure 8:
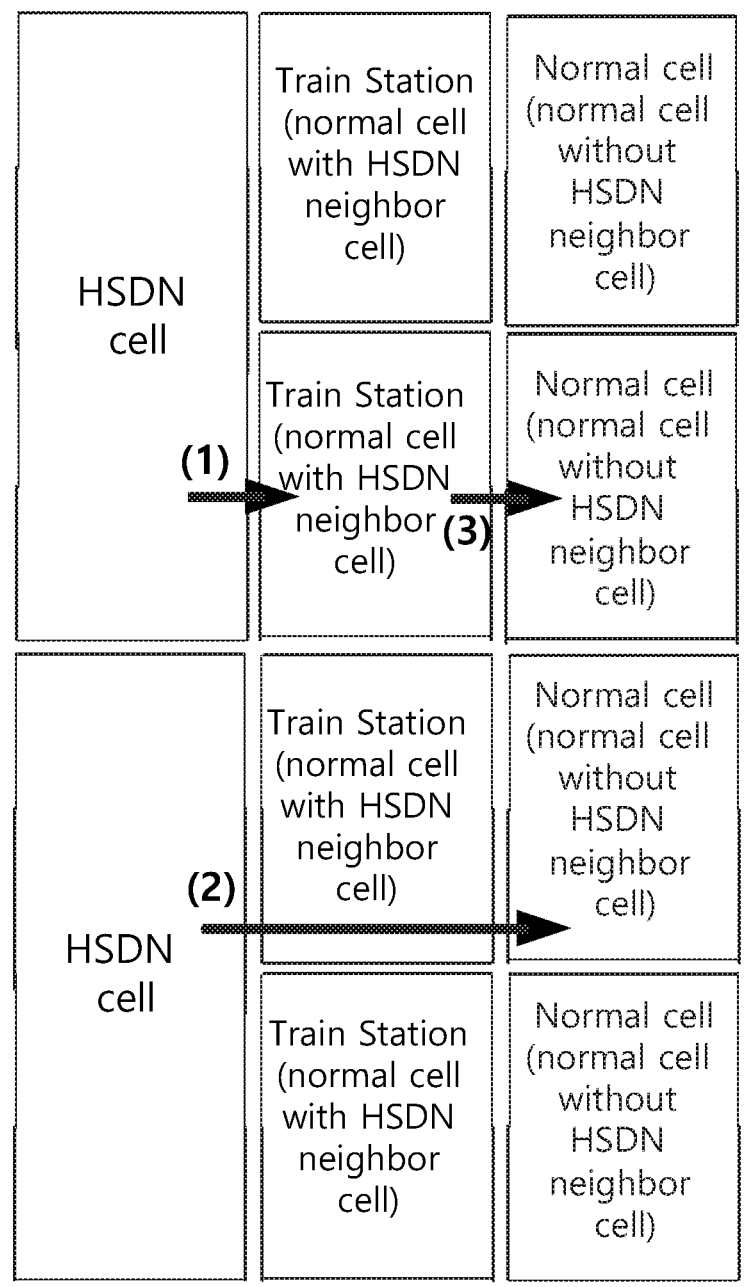
FIG. 8 shows an example of estimating mobility state of a UE according to an embodiment of the present invention.

FIG. 8 shows an example of estimating mobility state of an UE according to an embodiment of the present invention.

Referring to a first case (1) shown in FIG. 8, UE in the train may stop at train station.

The UE may get on the train and the UE may move to HSDN cell when UE becomes high speed. Thus, the mobility state on the UE may be considered as high speed.

Then, the UE in the train may stop at train station. The UE may not move fast during the train stops at train station. The speed of the UE may be considered as medium for a while. In this case, the UE may be now not in high speed. The UE may deprioritize the HSDN cell as lowest priority. Thus, the UE may reselect to the normal cell. The normal cell would have HSDN neighbor cell because the normal cell is in the train station.

After UE receives the broadcasted HSDN neighbor cell list from the normal serving cell, UE may increase MSE count until UE would be in high speed. In this case, the UE may be regarded being high speed. Further, the UE may prioritize the HSDN cell as highest priority.

When the UE may leave the train station, the UE may be actually in high speed. The UE may rapidly reselect to the HSDN cell as the HSDN cell is the highest priority.

If UE does not increase MSE count when UE reselects to the normal cell which broadcasts HSDN neighbor cells, the UE would reselect to the normal cell even if the train leaves the train station until UE frequently performs reselection and UE becomes high speed.

Referring to a second case (2) shown in FIG. 8, a UE may get off the train.

The UE may get on the train and UE may move to HSDN cell when the UE becomes high speed.

Then, the train may stop at train station which is final destination of the UE. In this case the UE may get off the train and walk through the train station. The UE would be in high speed for quite a while because UE was in the train and UE camped on HSDN cell. However, the UE would reselect to the normal cell when HSDN cell quality was a lot poor or UE lost HSDN cell.

Then, the UE may receive neighbor cell list and if the camped serving cell does not have HSDN neighbor cell, the UE would decrease MSE count until UE becomes medium or normal speed. That is, the UE may just count the cell change from the HSDN cell to a normal cell without HSDN neighbor cell.

If UE does not decrease MSE count when UE reselect to the normal cell which does not broadcast HSDN neighbor cells, the UE in high speed would keep searching HSDN cell with highest priority. If UE finds HSDN cell, UE may reselect to the HSDN cell which cell quality is worse than normal cell because the HSDN cell is the highest priority. Even though once UE lost the HSDN cell or the HSDN cell was a lot poor, the cell quality may be changed continuously and the HSDN cell would be found after a while. However, even if UE finds the HSDN cell, the cell quality may be worse than normal cell. Then, UE may repeat reselecting and losing the HSDN cell.

Therefore, if UE decrease the MSE count in above case, UE would deprioritize the HSDN cell and normally reselect to the normal cell.

Referring to a third case (3) shown in FIG. 8, a UE may get out of train station.

The UE may get on the train and UE moves to HSDN cell when UE becomes high speed. The train may stop at train station. The UE may get off the train and walks through the train station. The UE would be in high speed for quite a while because UE was in the train and UE camped on HSDN cell. However, UE would reselect to the normal cell when HSDN cell quality was temporarily a lot poor or UE temporarily lost HSDN cell.

Then, the UE may receive neighbor cell list and if the camped serving cell has HSDN neighbor, the UE would keep MSE count high speed as the first case (1). The UE may go back to the train, so the UE may keep MSE count high.

The UE may reselect to the normal cell. The UE may receive neighbor cell list and if the camped serving cell does not have HSDN neighbor cell, the UE may decrease MSE count until UE becomes medium or normal speed.

If UE reselects to the normal cell and the cell has HSDN neighbor cell list, the cell would be near the HSDN cell. Then, UE may need to keep high speed because UE may go back to the train. After UE moves to the normal cell and the normal cell does not have HSDN neighbor cell list, the normal cell would not be near the HSDN cell. Then, UE may need to decrease MSE count.

According to an embodiment of the present invention, state transitions for HSDN capable UE may be performed as follow.

State Detection Criteria:
Medium-Mobility State Criteria:
If number of cell reselections during time period TCRmax exceeds NCR_M and not exceeds NCR_H
High-Mobility State Criteria:
If number of cell reselections during time period TCRmax exceeds NCR_H The UE shall not count consecutive reselections between same two cells into mobility state detection criteria if same cell is reselected just after one other reselection.

Regard to State transitions, the UE shall:
if the criteria for High-mobility state is detected:
enter High-mobility state.
else if the criteria for Medium-mobility state is detected:
enter Medium-mobility state.
else if criteria for either Medium- or High-mobility state is not detected during time period TCRmaxHyst:
enter Normal-mobility state.

If the UE is in High- or Medium-mobility state, the UE shall apply the speed dependent scaling rules.

Figure 9:
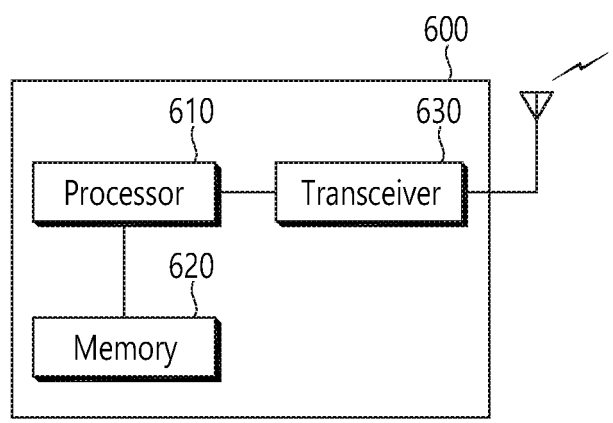
FIG. 9 shows a UE to implement an embodiment of the present invention.

The HSDN capable UE shall:
If UE is not in High-mobility state and the previous serving cell was HSDN cell:
If the current serving cell is not HSDN and broadcasts HSDN in neighbour cell list:
Increase the number of cell reselections until the number of cell reselections exceeds NCR_H
If UE is in High-mobility state and the previous serving cell was HSDN cell:
If the current serving cell is not HSDN and does not broadcasts HSDN in neighbour cell list:
Decrease the number of cell reselections until the number of cell reselections becomes below NCR_H
If UE is in High-mobility state and the previous serving cell was not HSDN cell but broadcasted HSDN in neighbour list:
If the current serving cell is not HSDN and does not broadcasts HSDN in neighbour cell list:
Decrease the number of cell reselections until the number of cell reselections becomes below NCR_H FIG. 9 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610.

Specifically, the processor 610 is configured to enter a second cell from a first cell, wherein the first cell provides specific information. The specific information may inform that a cell providing the specific information is high-speed-railway dedicated network (HSDN) cell. The HSDN cell may include plurality of public cells. The second cell may be a public cell.

The processor 610 is configured to receive neighbor cell list from the second cell.

The processor 610 is configured to count a number of cell changes for mobility state, based on whether the neighbor cell list from the second cell includes at least one of neighbor cells providing the specific information. The counting the number of cell changes for mobility state may include: increasing the counting until that the mobility state of the UE is considered as high mobility state. The processor 610 is further configured to enter a third cell from the second cell; receive neighbor cell list from the third cell; decrease the counting until that the mobility state of the UE is considered as normal mobility state when the neighbor cell list from the third cell does not include the at least one of neighbor cells providing the specific information. The counting the number of cell changes for mobility state may include: counting cell change from the first cell to the second cell when the neighbor cell list from the second cell does not include the at least one of neighbor cells providing the specific information.

The processor 610 is configured to adjust priority on the first cell as a highest priority when the neighbor cell list includes the at least one of neighbor cells providing the specific information. The UE may further configured to adjust priority on the first cell as a lowest priority when the neighbor cell list does not include the at least one of neighbor cells providing the specific information.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

According to embodiment of the present invention shown in FIG. 9, the MSE may be improved by adjusting the number of cell reselections in consideration of various scenarios in which the UE is involved in the HDSN cell.

Figure 10:
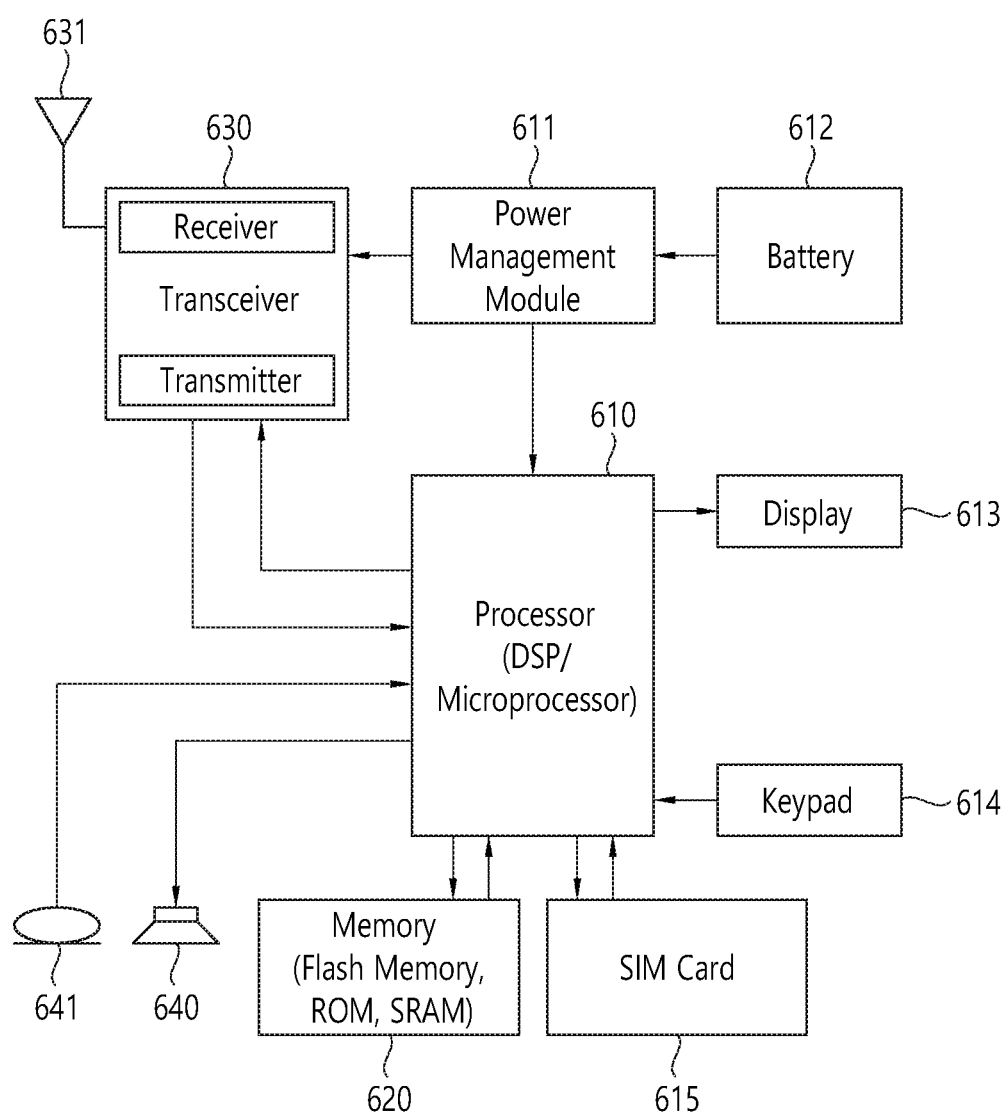
FIG. 10 shows more detailed UE to implement an embodiment of the present invention.

FIG. 10 shows more detailed UE to implement an embodiment of the present invention. The present invention described above for UE side may be applied to this embodiment.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The processor 610 is configured to enter a second cell from a first cell, wherein the first cell provides specific information. The specific information may inform that a cell providing the specific information is high-speed-railway dedicated network (HSDN) cell. The HSDN cell may include plurality of public cells. The second cell may be a public cell.

The processor 610 is configured to receive neighbor cell list from the second cell.

The processor 610 is configured to count a number of cell changes for mobility state, based on whether the neighbor cell list from the second cell includes at least one of neighbor cells providing the specific information. The counting the number of cell changes for mobility state may include: increasing the counting until that the mobility state of the UE is considered as high mobility state. The processor 610 is further configured to enter a third cell from the second cell; receive neighbor cell list from the third cell; decrease the counting until that the mobility state of the UE is considered as normal mobility state when the neighbor cell list from the third cell does not include the at least one of neighbor cells providing the specific information. The counting the number of cell changes for mobility state may include: counting cell change from the first cell to the second cell when the neighbor cell list from the second cell does not include the at least one of neighbor cells providing the specific information.

The processor 610 is configured to adjust priority on the first cell as a highest priority when the neighbor cell list includes the at least one of neighbor cells providing the specific information. The UE may further configured to adjust priority on the first cell as a lowest priority when the neighbor cell list does not include the at least one of neighbor cells providing the specific information.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiment of the present invention shown in FIG. 10, the MSE may be improved by adjusting the number of cell reselections in consideration of various scenarios in which the UE is involved in the HDSN cell.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for a wireless device in wireless communication system, the method comprising:
   entering a second cell from a first cell, wherein the first cell provides specific information;
   receiving neighbor cell list from the second cell; and
   counting a number of cell changes for mobility state,
   wherein the number of cell changes is increased, until the mobility state of the wireless device is considered a high mobility state, based on the neighbor cell list from the second cell including at least one of neighbor cells providing the specific information.

2. The method of claim 1, wherein the specific information informs that a cell providing the specific information is high-speed-railway dedicated network (HSDN) cell.

3. The method of claim 2, wherein the HSDN cell includes plurality of public cells.

4. The method of claim 1, wherein the second cell is a public cell.

5. The method of claim 1, further comprising:
   entering a third cell from the second cell;
   receiving neighbor cell list from the third cell;
   decreasing the number of cell changes, until the mobility state of the wireless device is considered as normal mobility state, based on the neighbor cell list from the third cell not including the at least one of neighbor cells providing the specific information.

6. The method of claim 1, further comprising:
   adjusting priority on the first cell as a highest priority based on the neighbor cell list including the at least one of neighbor cells providing the specific information.

7. The method of claim 1, further comprising:
   adjusting priority on the first cell as a lowest priority based on the neighbor cell list not including the at least one of neighbor cells providing the specific information.

8. A wireless device in a wireless communication system, the wireless device comprising:
   a transceiver for transmitting or receiving a radio signal; and
   a processor coupled to the transceiver,
   the processor configured to:
   enter a second cell from a first cell, wherein the first cell provides specific information;
   receive neighbor cell list from the second cell; and
   count a number of cell changes for mobility state,
   wherein the number of cell changes is increased, until the mobility state of the wireless device is considered a high mobility state, based on the neighbor cell list from the second cell including at least one of neighbor cells providing the specific information.

9. The wireless device of claim 8, wherein the specific information informing that a cell providing the specific information is high-speed-railway dedicated network (HSDN) cell.

10. The wireless device of claim 9, wherein the HSDN cell includes plurality of public cells.

11. The wireless device of claim 8, wherein the second cell is a public cell.

12. A processor for a wireless communication device in a wireless communication system,
   wherein the processor is configured to control the wireless communication device to:
   enter a second cell from a first cell, wherein the first cell provides specific information;
   receive neighbor cell list from the second cell; and
   count a number of cell changes for mobility state,
   wherein the number of cell changes is increased, until the mobility state of the wireless device is considered a high mobility state, based on the neighbor cell list from the second cell including at least one of neighbor cells providing the specific information.

* * * * *